US006731042B1

(12) United States Patent
Bank et al.

(10) Patent No.: US 6,731,042 B1
(45) Date of Patent: May 4, 2004

(54) CONSTANT FORCE CARTRIDGE BRUSH HOLDER

(75) Inventors: John Bank, Chicago, IL (US); Doug Bank, Chicago, IL (US); Alex Aguayo, Skokie, IL (US)

(73) Assignee: Phoenix Electric Mfg. Co., Chicago, IL (US)

( * ) Notice: Subject to any disclaimer, the term of this patent is extended or adjusted under 35 U.S.C. 154(b) by 33 days.

(21) Appl. No.: 10/418,463

(22) Filed: Apr. 18, 2003

Related U.S. Application Data

(60) Provisional application No. 60/433,298, filed on Dec. 13, 2002.

(51) Int. Cl.[7] ........................ H02K 13/00; H02K 13/10

(52) U.S. Cl. ....................... 310/239; 310/248; 310/249; 310/251

(58) Field of Search ................................ 310/239, 248, 310/249, 251

(56) References Cited

U.S. PATENT DOCUMENTS

| | | | | |
|---|---|---|---|---|
| 2,637,714 A | | 5/1953 | Spielman | |
| 2,695,968 A | | 11/1954 | Welch et al. | |
| 3,418,505 A | | 12/1968 | Mihalko et al. | |
| 4,110,651 A | * | 8/1978 | Fagan | 310/239 |
| 4,272,695 A | | 6/1981 | Buchwald et al. | |
| 4,371,803 A | * | 2/1983 | Schindel | 310/242 |
| 4,488,078 A | | 12/1984 | Orton | |
| 5,402,027 A | | 3/1995 | Strobl | |
| 5,463,264 A | * | 10/1995 | Koenniter | 310/242 |
| 5,631,513 A | | 5/1997 | Coles et al. | |
| 5,808,393 A | | 9/1998 | Penfold et al. | |

FOREIGN PATENT DOCUMENTS

| | | | | |
|---|---|---|---|---|
| GB | 2028007 A | * | 8/1979 | H02K/5/14 |
| GB | 2028007 | | 2/1980 | |

* cited by examiner

*Primary Examiner*—Burton S. Mullins
*Assistant Examiner*—Iraj A. Mohandesi
(74) *Attorney, Agent, or Firm*—Much Shelist; Adam K Sacharoff

(57) ABSTRACT

A brush holder assembly for use in an electric actuating device includes a cylindrical sleeve mounted in a housing of the device. The sleeve incorporates a tube that has an end extending inwardly toward a commutator. The tube may also have a length longer than the cylindrical sleeve, such that the end extends beyond the opening. A U-shaped shunt, having a uniform thickness, is slidably positioned within the tube. The U-shaped shunt has flanges extending outwardly from legs that extend towards the commutator. A brush is positioned between the legs of the shunt with a constant force spring being positioned between the brush and the inner surface of the U-shaped shunt. The spring has a pair of coiled ends that are positioned against the flanges. The spring also includes a middle portion that engages one end of the brush to resiliently push the brush against the commutator with a constant applied force. The U-shaped shunt is connected to the brush by a pig tail wire. In addition, the tube has two pairs of longitudinally diametric extending slots, one pair for receiving and positioning the shunt and the other pair for receiving and positioning the brush. Lastly, a removable cap is positioned in the sleeve for retaining the shunt, spring and brush within the sleeve during operation. In addition, a longitudinal slot is positioned between the tube and the sleeve for receiving a terminal connector, onto which a lead wire is crimped, which is connected to an external electrical source.

20 Claims, 1 Drawing Sheet

10
12
14
16
18
20
22
24
26
28
30
32
34
36
38
40
42

CONSTANT FORCE CARTRIDGE BRUSH HOLDER

This application claims benefit of Ser. No. 60/433,298 filed Dec. 13, 2002.

FIELD OF THE INVENTION

The present invention relates to a brush holder for use with electric actuating devices.

BACKGROUND OF THE INVENTION

Prior to the present invention, a certain style of brush holder for electric actuating devices (such as rotating or linear moving electric apparatus, dynamos, motors, and generators) incorporated a cartridge-style brush holder providing for an externally replaceable brush. Because of prior design limitations and space considerations, the prior cartridge-style brush holders necessitated using a brush which utilized a helical coil compression spring to push the brush towards the rotating or moving surface of the electric device. A helical coil compression spring, however, provides uneven and erratic pressure on the brush during the life of the brush, because as the brush wears down, the helical coil spring decompresses ("relaxes") and the spring pressure decreases resulting in an erratic rate of wear as the brush gets shorter due to the declining spring force. This leads to less than optimal performance, decreased life of the brush, more frequent and costly replacement of the brushes and increased maintenance on the electric device. Additionally, the helical coil compression spring takes up a disproportionately large amount of interior space inside the brush holder that could otherwise be utilized by a longer brush. One solution to this problem was the introduction of a constant force spring. By providing a constant force of spring pressure to the brush, the brush will exhibit a consistent wear rate, a constant rate of pressure of applied force to the brush, reduced wear of the contact surface, longer brush life, more optimal device performance and lower overall maintenance costs. However, the brush holder assemblies incorporating constant force springs were completely internal to and wholly encapsulated in the electric actuating devices, as shown in U.S. Pat. No. 2,695,968 to Welch et al., and not in a cartridge-style brush holder with an externally replaceable brush.

While still providing and augmenting the principal advantages of the cartridge-style brush holder with an externally replaceable brush, the present invention: (1) allows for the longest brush possible to be utilized in any particular electric actuating device given the device's particular dimensions, resulting in the longest possible brush life and device life; (2) permits ease and efficiency of assembly into the electric actuating device; (3) provides a robust and durable design; (4) reduces replacement and maintenance costs; and (5) allows for the brush to be easily replaced externally without the undue labor, cost, damage and danger of disassembling and attempting to maintain the electric actuating device. In fact, a constant force cartridge-style brush holder with an externally replaceable brush allows for an even longer brush than could previously be achieved because the constant force spring utilizes less interior space in the brush holder than the helical coil compression spring system that existed before. This space can now be utilized by additional brush length.

One prior art reference, U.S. Pat. No. 5,463,264 to Koenitzer (the '264 patent) attempted to incorporate one type of constant force spring brush assembly into a cartridge-style brush holder providing for an externally replaceable brush.

However, the '264 patent when utilized for its intended purpose, was found to have practical manufacturing, application and performance problems. First, because of significant loads exhibited by the brush holder during use, the U-shaped retainer defined by the '264 patent had a tendency to fracture in several different areas, such as in the recesses (where the material is the thinnest) or along the middle top portion (in an area separating the two legs), at which point the brush holder described in the '264 patent is rendered unsatisfactory. It is a critical aspect of the invention to replace a worn brush and not a cracked or broken brush holder. It is thus a first objective of the present invention to replace the U-shaped retainer defined by the '264 patent with a differently designed, more durable, stronger U-shaped shunt.

Second, the '264 patent includes a single container with slots defined therein for the receipt of the legs of the U-shaped retainer and the brush holder. When assembled, the end of the brush extends directly out of the end of the container for contact with the commutator, leaving a majority of the brush maintained within the container. There is no separate protective interior tube in the '264 patent. This presents problems during use, as strong vibration forces, high temperatures and noise from the operation of the electric actuating device tend to cause failures and problems in the container and U-shaped retainer. It is thus a second objective of the present invention to provide a means of adequately compensating for the temperature, noise, and vibrations generated by the brush and the operation of the electric actuating device.

Third, the '264 patent describes a cylindrical container with a pair of longitudinally extending slots for directly receiving the retainer and the brush. This cylindrical container is preferably made out of an insulating, non-conductive material such as plastic. The container described in the '264 patent would not provide for optimal device performance, because the brush would not optimally travel through the slot of the container due to less than optimal tolerancing and surface texture of the slots in the container due to the nature and composition of the material comprising the container. This would cause an uneven an unpredictable rate of brush wear. It is thus an objective of the present invention to provide a superior, more robust brush holder that provides for better device performance and longer brush life, and provides for a smoother brush ride and optimal brush wear during operation of the device.

Lastly, the '264 patent states that the brush is connected to a shunt (wire) which is further connected to a terminal that fits between a brass strip inserted into a slot in the cylindrical container. While the '264 patent does not state how the brush holder assembly is connected to an external electrical source (external to the container), it is widely known that some type of terminal connection must be contained in the brush holder assembly and attached to the external electrical source, in order to run electrical current through the brush, to create the magnetic flux and drive the electric actuating device. The '264 patent fails to provide pragmatic means for which to attach the connection to the external electrical source to the brush holder for running the electrical current through the brush. Typically, a lead wire is crimped to the terminal connection. However, in the '264 patent, the terminal connection (terminal 34) is connected to the brush (14) and maintained within the container (25). To achieve the external electrical connection, an additional terminal connector would have to be connected in some undescribed fashion to the opposite side of the first terminal connection (34) and placed within the slot formed between the conductive strip (not labeled) and the container 25 [See FIG. 2 of U.S. Pat. No. 5,463,264]. The conductive strip allows the electrical current to flow from the undescribed additional terminal connector (which is connected to the external electrical source) to the terminal (34). With the need for the additional terminal connector, product and manufacturing costs are increased. In addition, this also makes the manufacturing and assembly process more complicated and costly. It is thus an objective of the present invention to provide the optimal means of facilitating the connection of the brush holder assembly to the external electrical source, which is more cost effective, lowers product and manufacturing costs, and provides an easier method of fabrication.

SUMMARY OF THE INVENTION

In accordance with the present invention a brush holder for use with an electric actuating device is provided. The brush holder includes a cylindrical sleeve mounted in the housing of the device and having an opening extending radially inward toward a commutator of the device. (As used herein, the term "commutator" shall include, but not be limited to, commutators, slip rings and any other moving surface onto which or from which an electric current is directed or generated.) The sleeve incorporates a tube that has an end extending inwardly toward the commutator. The tube may have a length longer than the cylindrical sleeve, such that the end extends beyond the opening. A U-shaped shunt, preferably having a uniform thickness, is slidably positioned within the tube. The U-shaped shunt has legs extending radially inward towards the commutator of the device; the legs of the shunt also have flanges extending outwardly therefrom. A brush, preferably, but not limited to, a carbon brush, is positioned between the legs of the shunt with a constant force spring being positioned between the brush and the inner surface of the U-shaped shunt. The constant force spring has a pair of coiled ends that are manually positioned against the flanges. The constant force spring also includes a middle portion that engages the center of one end of the brush in order to resiliently push the brush against the commutator of the electric actuating device with a constant force. The U-shaped shunt is connected to the brush by a pig tail wire.

In addition, the tube has two pairs of longitudinally diametric extending slots, one pair for receiving and positioning the shunt and the other pair for receiving and positioning the brush. Also, a removable cap is positioned within a radially outer end of the sleeve for retaining the shunt, constant force spring and brush within the sleeve during operation of the device. Furthermore, a longitudinal slot is positioned between the tube and the cylindrical sleeve for receiving a terminal connector onto which is crimped a lead wire which in turn is connected to an external electrical source.

The present invention includes a tube (preferably made out of a conductive metallic material, including, but not limited to, brass), within a sleeve (preferably made out of an insulating non-conductive material including, but not limited to, thermosetting and thermoplastic plastic resins). The tube will slidably receive the brush, the constant force spring and U-shaped shunt. The material of the tube is such that it has a greater ability to dampen noise and vibration and dissipate heat during operation than the material used in the prior art. The surface texture of the material of the tube has a greater ability to provide for an optimal brush ride for the brush than the surface texture of the material used in the prior art. This leads to longer brush life and more optimal device performance. The present invention also allows closer, tighter tolerances to be attained than the prior art. This provides for less brush movement, less brush "chatter", less brush dust and significantly reduces the occurrences of arcing and device failure.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DESCRIPTION OF THE INVENTION

Figure 1:
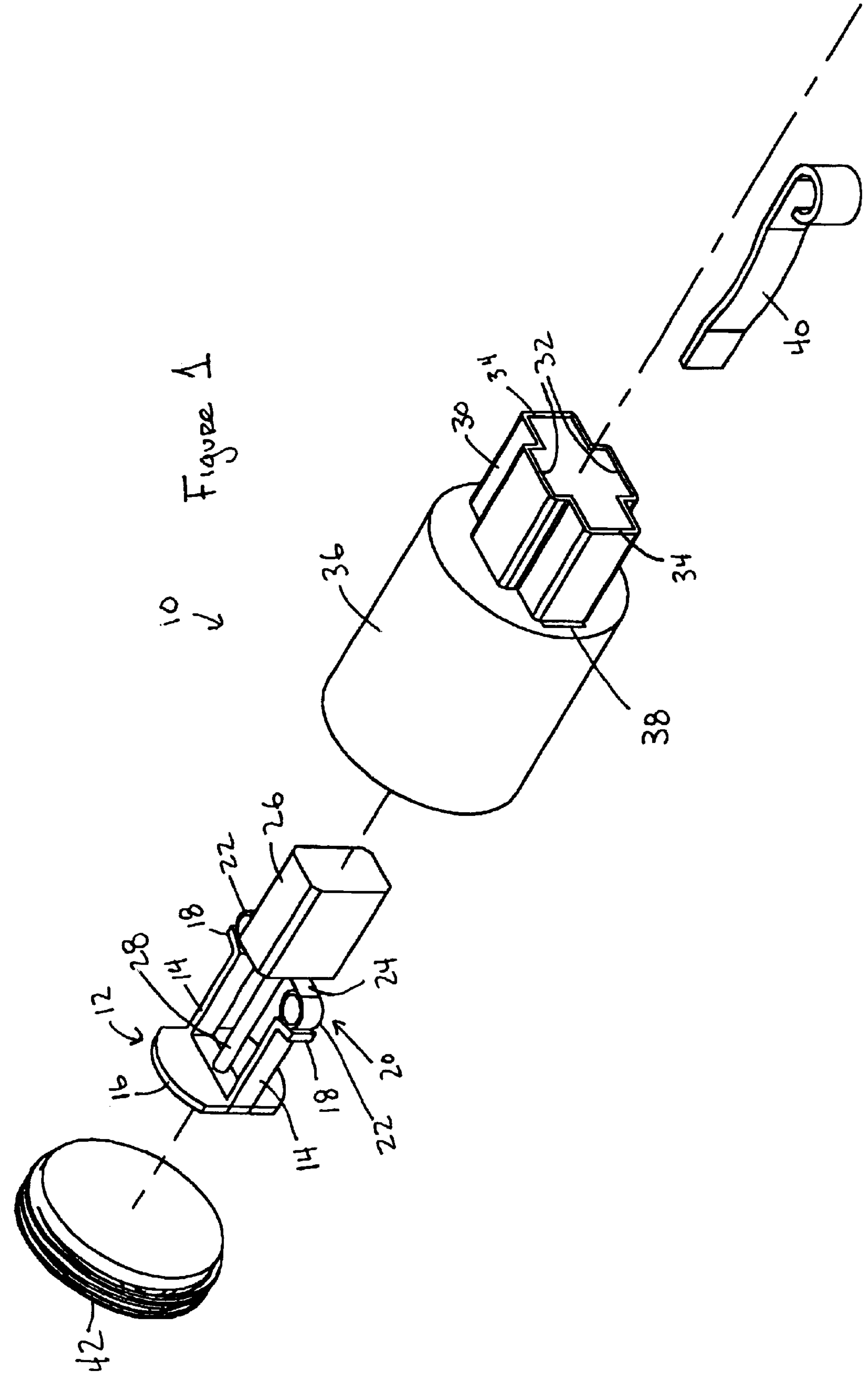
FIG. 1 is a perspective exploded view of the present invention.

While the invention is susceptible to embodiments in many different forms, there are shown in the drawings and will be described herein the preferred embodiments of the present invention. It should be understood, however, that the present disclosure is to be considered an exemplification of the principles of the invention and is not intended to limit the spirit or scope of the invention and/or claims by the embodiments illustrated.

Referring to FIG. 1, the present invention is directed to a cartridge-style constant force brush holder 10 used in electric actuating devices (as defined throughout the Specification and Claims, the term "electric actuating device" shall include, but not be limited to, an electric actuating device, any rotating or linear moving electric apparatus, dynamo, motor and generator). Also, as used herein throughout the Specification and Claims, the term "commutator" shall include, but not be limited to, commutators, slip rings and any other moving surface onto which or from which an electric current is directed or generated. The brush holder 10 includes a U-shaped shunt 12 defined as having a pair of legs 14 extending away from a middle portion 16. Each leg 14 includes an outwardly extending flange 18. To increase the strength of this piece over the prior art, the present invention uses a differently designed, stronger U-shaped shunt with flanges 18 extending outwardly from the legs of the shunt to engage coiled ends 22 of a constant force spring 20 when assembled. The thickness of the material used for manufacturing the U-shaped shunt is preferably uniform throughout and is not compromised by cutting, removing, or molding recesses or holes. The material is also stronger because the present invention preferably uses a conductive metallic material.

As mentioned above, a constant force spring 20 is provided and includes a pair of coiled ends 22 and a middle portion 24. A brush 26, preferably, but not limited to, a carbon brush, is also provided, which, when the brush holder 10 is assembled (defined in greater detail below), is slidably received within the legs 14 of the U-shaped shunt 12 and is engaged by the middle portion 24 of the constant force spring 20. The middle portion 16 of the U-shaped shunt 12 is attached to the brush 26 by a pig tail wire 28.

To overcome problems associated with brush movement, high vibrations, temperatures, and noise generated by the electric actuating device and the brush 26, when the brush 26 is in contact with the commutator, the present invention includes a tube 30 extending out of an sleeve 36. The tube 30 is extruded, molded, formed or stamped from a preferably conductive metallic material, including, but not limited to, brass. The material is such that it provides for a more robust design and has a tendency to dampen the noise and vibration and dissipate heat during operation. The tube 30 will also attain closer tolerances than the prior art and thus reduce the brush 26 movement and "chatter", allowing for a smoother, more consistent brush ride, better brush wear and providing for optimal device performance while minimizing arcing. The sleeve 36 is extruded, molded, formed or stamped from a preferably non-conductive material, including, but not limited to, thermosetting and thermoplastic plastic resins, such that the sleeve 36 forms an insulation around the tube 30. The tube 30 slidably receives the brush 26, the constant force spring 20 and the U-shaped shunt 12 (referred to herein as "the assembly"). The tube 30 has two pairs of diametric slots; one pair 32 for receiving and positioning the brush and the other pair 34 for receiving and positioning the legs 14 and flanges 18 of the U-shaped shunt and the coiled ends 24 of the constant force spring. The tube 30 is incorporated into the sleeve 36, which is attached to a housing.

The sleeve 36 has a larger diameter than the tube 30 and has an internal bore that is sized to meet and correspond to the outer perimeter design of the tube 30. Since the sleeve 36 has a larger diameter than the tube 30, the size of the bore (which would receive the tube 30), may be changed, within a range (as dictated by the specifications of the electric actuating device), either larger or smaller, to receive a different-sized tube and thus accommodate different-sized brushes. Even if a different brush size was being accommodated, the overall diameter of the sleeve 36, within a certain range, would not change, permitting the present invention to fit into a standard sized aperture in the housing of the electric actuating device while being able to accommodate different sizes of brushes. This is additionally advantageous, as the present invention provides for a simple retooling of the internal bore to accommodate larger or smaller tubes and brushes, while maintaining the same sleeve 36 with a constant outer diameter, within a certain range. The prior art, however, would at significant cost, require an entirely new sleeve (or container) and housing aperture to be tooled for every different brush size desired, which is overcome by the present invention.

A channel or slot 38 is positioned externally to the tube 30, between one of the slots of the tube and the sleeve 36 for receipt of a terminal connector 40. The terminal connector 40 is inserted and positioned into the channel or slot 38, against the tube 30 and the sleeve 36, such that when a lead wire (not shown in the figure) runs from an external electrical source ("external" from the brush holder 10) and is crimped to the terminal connector 40, an electrical connection is maintained through the brush 26 without having to sever the integrity of the connection when the brush is removed from the tube 30.

The sleeve 36 lastly includes a threaded region (not shown) which mates with a threaded cap 42. When the cap 42 is engaged with the sleeve 36, the cap retains the U-shaped shunt 12 in place and enables the brush to optimally function.

When assembling the brush holder 10, the brush 26 is manually positioned against the middle portion 24 of the constant force spring 20 while the coiled ends 22 of the constant force spring 20 are held against the flanges 18 of the legs 14 of the U-shaped shunt 12. When not assembled or when removed from the tube 30, the constant force spring 20 is not constantly held in position, permitting the constant force spring 20 to freely move around; since inserting the assembly into the tube 30 can only be accomplished by manually holding and aligning the coiled ends 22 of the constant force spring 20 against the flanges 18 of the legs 14 of the U-shaped shunt 12 and holding the brush 30 against the middle portion 24 of the constant force spring 20. The assembly is then inserted into the tube 30. The cap 42 is then threaded into the sleeve 36. Since the tube 30 is aligned with the commutator of the electric actuating device, the lateral pressure of the commutator will slidably force the brush 26 between the legs 14 of the U-shaped shunt 12. The constant force spring 20 will then exert a constant force of pressure against the brush 26 forcing the brush 26 to engage the commutator with a substantially constant force of pressure as the brush 26 wears.

In one instance of manufacturing, the constant force spring 20 is affixed to the brush 26 and the pig tail wire 28 is affixed to both the brush 26 and the U-shaped shunt 12. As such, when the brush 26 is worn the entire assembly may be removed and easily replaced. However, in another instance, if so desired, the assembly may be easily disassembled and reassembled such that only the brush 26 will be replaced when worn.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or inferred. It is intended to cover by the appended claims all such modifications as fall within the scope of the claims.

We claim:

1. A brush holder for use with an electric actuating device in a housing comprising:

a cylindrical sleeve mounted in said device and having an opening extending radially inward toward a commutator of said device;

a tube secured within the cylindrical sleeve and having an end extending inwardly toward the commutator;

a U-shaped shunt slidably positioned within said tube with legs of said U-shaped shunt extending radially inward towards the commutator of said device, the U-shaped shunt having flanges extending outwardly therefrom;

a brush positioned between said legs of said shunt;

a constant force spring positioned between said brush and the inner surface of said shunt, said spring having a pair of coiled ends located against the flanges and having a middle portion for engaging one end of said brush for resiliently pushing said brush against the commutator of said device with a constant force;

said tube having two pairs of longitudinally diametric extending slots for receiving and positioning said shunt and said brush; and a removable cap positioned within a radially outer end of said sleeve for keeping said shunt, spring and brush within said sleeve during operation of said device.

2. The brush holder of claim 1, wherein the tube has a length longer than the cylindrical sleeve, such that the end extends beyond the opening.

3. The brush holder of claim 1 further comprising a pig tail wire connected from the brush to the U-shaped shunt.

4. The brush holder of claim 1, wherein the U-shaped shunt has a uniform thickness.

5. The brush holder of claim 1, wherein the tube is made of a material that attains tighter tolerances and dissipates heat and dampens noise and vibration during operation of said device.

6. The brush holder of claim 5, wherein the material of the tube is a conductive material, including, but not limited to, brass.

7. The brush holder of claim 4, wherein the U-shaped shunt is made of a conductive material.

8. The brush holder of claim 1 further comprising:

a longitudinal slot positioned between the tube and the sleeve for receiving and engaging a terminal connection; and a terminal connector being positioned in the slot, wherein a lead wire leading to an-electrical source is crimped to the terminal connector external to the tube.

9. A brush holder for use with an electric actuating device in a housing comprising:

a cylindrical sleeve mounted in said device and having an opening extending radially inward toward a commutator of said device;

a U-shaped shunt having a uniform thickness throughout and being slidably positioned within said sleeve with legs of said U-shaped shunt extending radially inward towards the commutator of said device, the U-shaped shunt having flanges extending outwardly therefrom;

a brush positioned between said legs of said shunt;

a constant force spring positioned between said brush and the inner surface of said shunt, said spring having a pair of coiled ends located against the flanges and having a middle portion for engaging one end of said brush for resiliently pushing said brush against the commutator of said device with a constant force;

a pig tail wire connected from the brush to the U-shaped shunt;

said sleeve having two pairs of longitudinally diametric extending slots for receiving and positioning said shunt and said brush; and a removable cap positioned within a radially outer end of said sleeve for keeping said shunt, spring and brush within said sleeve during operation of said device.

10. The brush holder of claim 9, further comprising a tube secured within the cylindrical sleeve and having an end extending inwardly toward the commutator.

11. The brush holder of claim 10, wherein the tube has a length longer than the cylindrical sleeve, such that the end extends beyond the opening, and wherein the pairs of diametric slots are integral to the tube.

12. The brush holder of claim 10, wherein the tube is made of a material that attains tighter tolerances and dissipates heat and dampens noise and vibration during operation of said device.

13. The brush holder of claim 9, wherein the material of the tube is a conductive material, including, but not limited to, brass.

14. The brush holder of claim 9, wherein the U-shaped shunt is made of a conductive material.

15. The brush holder of claim 9 further comprising:

a longitudinal slot positioned between the tube and the sleeve for receiving and engaging a terminal connection; and a terminal connector being positioned in the slot, wherein a lead wire leading to an electrical source is crimped to the terminal connector external to the tube.

16. A brush holder for use with an electric actuating device in a housing comprising:

a cylindrical sleeve mounted in said device and having an opening extending radially inward toward a commutator of said device;

a tube secured within the cylindrical sleeve and having an end extending inwardly toward the commutator, the tube having a length longer than the cylindrical sleeve, such that the end extends beyond the opening;

a U-shaped shunt slidably positioned within said tube with legs of said U-shaped shunt extending radially inward towards the commutator of said device, the U-shaped shunt having flanges extending outwardly therefrom;

a brush positioned between said legs of said shunt;

a constant force spring positioned between said brush and the inner surface of said shunt, said spring having a pair of coiled ends located against the flanges and having a middle portion for engaging one end of said brush for resiliently pushing said brush against the commutator of said device with a constant force;

a pig tail wire connected from the brush to the U-shaped shunt;

said tube having two pairs of longitudinally diametric extending slots for receiving and positioning said shunt and said brush;

a longitudinal slot positioned between the tube and the sleeve for receiving and engaging a terminal connection; and a terminal connector being positioned in the slot, wherein a lead wire leading to an electrical source is crimped to the terminal connector external to the tube;

a removable cap positioned within a radially outer end of said sleeve for keeping said shunt, spring and brush within said sleeve during operation of said device.

17. The brush holder of claim 16, wherein the U-shaped shunt has a uniform thickness.

18. The brush holder of claim 17, wherein the U-shaped shunt is made of a conductive material.

19. The brush holder of claim 18, wherein the tube is made of a conductive material that attains tolerances and dissipates heat and dampens noise and vibration during operation of said device.

20. The brush holder of claim 19, wherein the conductive material of the tube is but not limited to, brass.

* * * * *